(12) United States Patent
Smith et al.

(10) Patent No.: US 10,519,805 B2
(45) Date of Patent: Dec. 31, 2019

(54) TURBINE CASE COUPLING

(71) Applicant: United Technologies Corporation, Hartford, CT (US)

(72) Inventors: Darren M. Smith, Andover, CT (US); Jonathan A. Scott, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 795 days.

(21) Appl. No.: 14/685,144

(22) Filed: Apr. 13, 2015

(65) Prior Publication Data

US 2016/0298492 A1    Oct. 13, 2016

(51) Int. Cl.

| F01D 25/24 | (2006.01) |
|---|---|
| F16B 7/18 | (2006.01) |
| F02K 1/80 | (2006.01) |
| F16B 7/06 | (2006.01) |
| F16B 33/00 | (2006.01) |
| F16B 41/00 | (2006.01) |

(52) U.S. Cl.
CPC ............... F01D 25/24 (2013.01); F02K 1/80 (2013.01); F16B 7/185 (2013.01); F05D 2250/25 (2013.01); F05D 2250/281 (2013.01); F05D 2260/30 (2013.01); F16B 7/06 (2013.01); F16B 33/004 (2013.01); F16B 41/002 (2013.01); Y10T 403/7067 (2015.01)

(58) Field of Classification Search
CPC ........ F01D 25/24; F01D 25/243; F01D 25/28; F02K 1/80; F05D 2250/25; F05D 2250/281; F05D 2260/30; F16B 7/06; F16B 7/185; Y10T 403/29; Y10T 403/56; Y10T 403/7067
USPC ...................... 403/43, 299, 374.3; 415/213.1
See application file for complete search history.

(56) References Cited

U.S. PATENT DOCUMENTS

| 1,781,091 A | * | 11/1930 | Wilson | E21B 17/046 |
|---|---|---|---|---|
| | | | | 285/148.19 |
| 1,901,286 A | * | 3/1933 | Coe | F16B 7/182 |
| | | | | 403/340 |
| 3,572,777 A | * | 3/1971 | Blose | E21B 17/042 |
| | | | | 285/334 |
| 3,914,067 A | | 10/1975 | Leto | |

(Continued)

FOREIGN PATENT DOCUMENTS

| CH | 350307 | 11/1960 |
|---|---|---|
| FR | 1165590 | 10/1958 |

(Continued)

OTHER PUBLICATIONS

EP search report for EP16165137.7 dated Oct. 11, 2016.

(Continued)

Primary Examiner — Josh Skroupa
(74) Attorney, Agent, or Firm — O'Shea Getz P.C.

(57) ABSTRACT

A first case includes a first plurality of threads, a second case includes a second plurality of threads, an interface provides at least one of anti-rotation or alignment with respect to the first case and the second case, and a nut includes a third plurality of threads configured to engage with the first plurality of threads and a fourth plurality of threads configured to engage with the second plurality of threads.

16 Claims, 11 Drawing Sheets

(56) References Cited

U.S. PATENT DOCUMENTS

| | | | | |
|---|---|---|---|---|
| 4,397,484 A * | 8/1983 | Miller | ............... | E21B 17/042 285/148.19 |
| 4,762,344 A * | 8/1988 | Perkins | ............... | E21B 17/08 285/148.19 |
| 5,020,932 A | 6/1991 | Boyd | | |
| 5,474,334 A * | 12/1995 | Eppink | ............... | E21B 7/067 175/74 |
| 5,689,871 A * | 11/1997 | Carstensen | ............... | E21B 17/042 29/401.1 |
| 5,950,744 A * | 9/1999 | Hughes | ............... | E21B 17/046 166/242.6 |
| 6,070,912 A * | 6/2000 | Latham | ............... | F16L 15/008 285/148.19 |
| 6,336,790 B1 | 1/2002 | Jacobsson | | |
| 6,672,966 B2 * | 1/2004 | Muju | ............... | F16D 1/112 415/124.2 |
| 6,908,121 B2 * | 6/2005 | Hirth | ............... | E21B 17/043 285/305 |
| 7,169,239 B2 * | 1/2007 | Reavis | ............... | E21B 43/103 148/320 |
| 7,438,329 B2 * | 10/2008 | DeLange | ............... | E21B 17/042 285/333 |
| 7,478,842 B2 * | 1/2009 | Reynolds, Jr. | ............... | F16L 15/004 285/333 |
| 7,585,002 B2 * | 9/2009 | Curley | ............... | E21B 43/103 285/333 |
| 7,699,354 B2 * | 4/2010 | Beard | ............... | F16L 37/138 285/108 |
| 8,496,273 B1 * | 7/2013 | Carstensen | ............... | F16L 15/04 285/333 |
| 8,739,901 B2 * | 6/2014 | Cote | ............... | E21B 4/10 175/107 |
| 8,875,378 B2 * | 11/2014 | Coffin | ............... | F01D 5/026 29/525.01 |
| 8,882,157 B2 * | 11/2014 | Chelette | ............... | F16L 15/001 285/333 |
| 9,261,207 B1 * | 2/2016 | Nations, Jr. | ............... | E21B 17/02 |
| 9,470,151 B2 * | 10/2016 | Ruberte Sanchez | ............... | F02K 3/10 |
| 9,605,780 B2 * | 3/2017 | Ischebeck | ............... | F16L 15/003 |
| 9,829,127 B2 * | 11/2017 | Sugino | ............... | E21B 17/042 |
| 2003/0017878 A1 | 1/2003 | Muju | | |
| 2003/0119589 A1 * | 6/2003 | Behrensmeier | ............... | B60K 17/24 464/178 |
| 2003/0122373 A1 | 7/2003 | Hirth et al. | | |
| 2004/0194278 A1 * | 10/2004 | Brill | ............... | E21B 17/042 29/456 |
| 2009/0025461 A1 | 1/2009 | Walters | | |
| 2011/0031020 A1 | 2/2011 | Cote | | |
| 2013/0051985 A1 | 2/2013 | Benjamin | | |
| 2013/0111735 A1 * | 5/2013 | Coffin | ............... | F01D 5/026 29/525.11 |
| 2014/0369784 A1 * | 12/2014 | Lagarde | ............... | F01D 25/16 411/81 |
| 2016/0376851 A1 * | 12/2016 | Morrow | ............... | E21B 17/0426 403/342 |

FOREIGN PATENT DOCUMENTS

| | | |
|---|---|---|
| IN | 194320 | 2/2006 |
| WO | WO9407072 | 3/1994 |

OTHER PUBLICATIONS

Eng-tips.com, "Simple question, not so simple to find answer", thread404-341996, available at <http://www.eng-tips.com/viewthread.cfm?qid=341996>, Mar.-Apr. 2013.

Wikipedia.org, "Hirth Joint", downloaded from <http://en.wikipedia.org/wiki/Hirth_Joint> on Feb. 23, 2015.

Gleason Works, "Back to Basics . . . Curvic Coupling Design", ASME Technical Conference, Paper No. 84-DT-153, Gear Technology, pp. 34-48, Nov. 1984.

Eagle Copters, "Instructions for Continued Airworthiness ICA-D212-725 Eagle Single", Dart Aerospace, Revision 5, available at <http://www.eaglecopters.com/pdf/Eagle%20Single%20Certs/CertsS_ICA-D212-725-Rev5.pdf>, Jun. 20, 2012.

* cited by examiner

TURBINE CASE COUPLING

BACKGROUND

A case of an aircraft engine may utilize a bolted flange. The flange may be subjected to high thermal gradients or stress, particularly in the hottest portions of the engine. In some instances, the stress can cause the flange to bend or crack. A cracked flange can cause the engine to be removed from a wing of the aircraft prematurely.

Case clocking can also cause the case to be out of alignment. As a result, bolts that are used are manufactured to tight tolerances to prevent such clocking from occurring. Manufacturing to such tight tolerances increases the cost of the bolts.

Furthermore, bracket attachment mechanisms frequently require the use of bolts of different lengths in different locations. Such configurations increase the likelihood of human/operator error during engine assembly or repair and imposes additional cost in terms of ensuring against an improper bolt being installed at a given location.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system for selectively coupling cases comprising: a first case including a first plurality of threads, a second case including a second plurality of threads, an interface configured to provide for at least one of anti-rotation or alignment with respect to the first case and the second case, and a nut including a third plurality of threads configured to engage with the first plurality of threads and a fourth plurality of threads configured to engage with the second plurality of threads. In some embodiments, the first plurality of threads and the third plurality of threads are oriented in a first direction, and the second plurality of threads and the fourth plurality of threads are oriented in a second direction. In some embodiments, the first plurality of threads and the third plurality of threads are oriented as left hand threads, and the second plurality of threads and the fourth plurality of threads are oriented as right hand threads. In some embodiments, the system further comprises: a first seal associated with the first case, and a second seal associated with the second case. In some embodiments, the system further comprises: a first retention ring associated with the first seal, and a second retention ring associated with the second seal. In some embodiments, at least one of the first retention ring or the second retention ring is configured to be removed when the first case is coupled to the second case. In some embodiments, the system further comprises: an insulation ring configured isolate the nut from hot air associated with the operation of an engine. In some embodiments, the insulation ring is made of at least one of a metallic material or a woven ceramic. In some embodiments, the system further comprises: an attachment mechanism configured to attach the nut to a bracket. In some embodiments, the attachment mechanism includes a T-head bolt and a bracket bolt rail. In some embodiments, the first plurality of threads and the second plurality of threads are substantially equal in terms of dimension or count. In some embodiments, the first plurality of threads and the second plurality of threads are unequal in terms of dimension or count. In some embodiments, the first case is associated with a high pressure turbine section of an engine. In some embodiments, the second case is associated with a low pressure turbine section of the engine. In some embodiments, at least one of the first case or the second case is associated with a duct. In some embodiments, at least one of the first case or the second case is a circular case. In some embodiments, the interface includes a curvic-type interface. In some embodiments, the nut is configured to rotate to cause the first plurality of threads to engage the third plurality of threads and the second plurality of threads to engage the fourth plurality of threads to couple the first case and the second case. In some embodiments, the third plurality of threads and the fourth plurality of threads are formed as symmetric threads via application of a first cutter to form the third plurality of threads and a second cutter to form the fourth plurality of threads. In some embodiments, the first plurality of threads and the second plurality of threads are thrilled as symmetric threads via application of a tool that includes a first cutter and a second cutter arranged in a master-slave configuration.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, apparatuses, systems and methods are described for reducing/minimizing stress experienced by one or more components or devices associated with a case of an engine.

Figure 1:
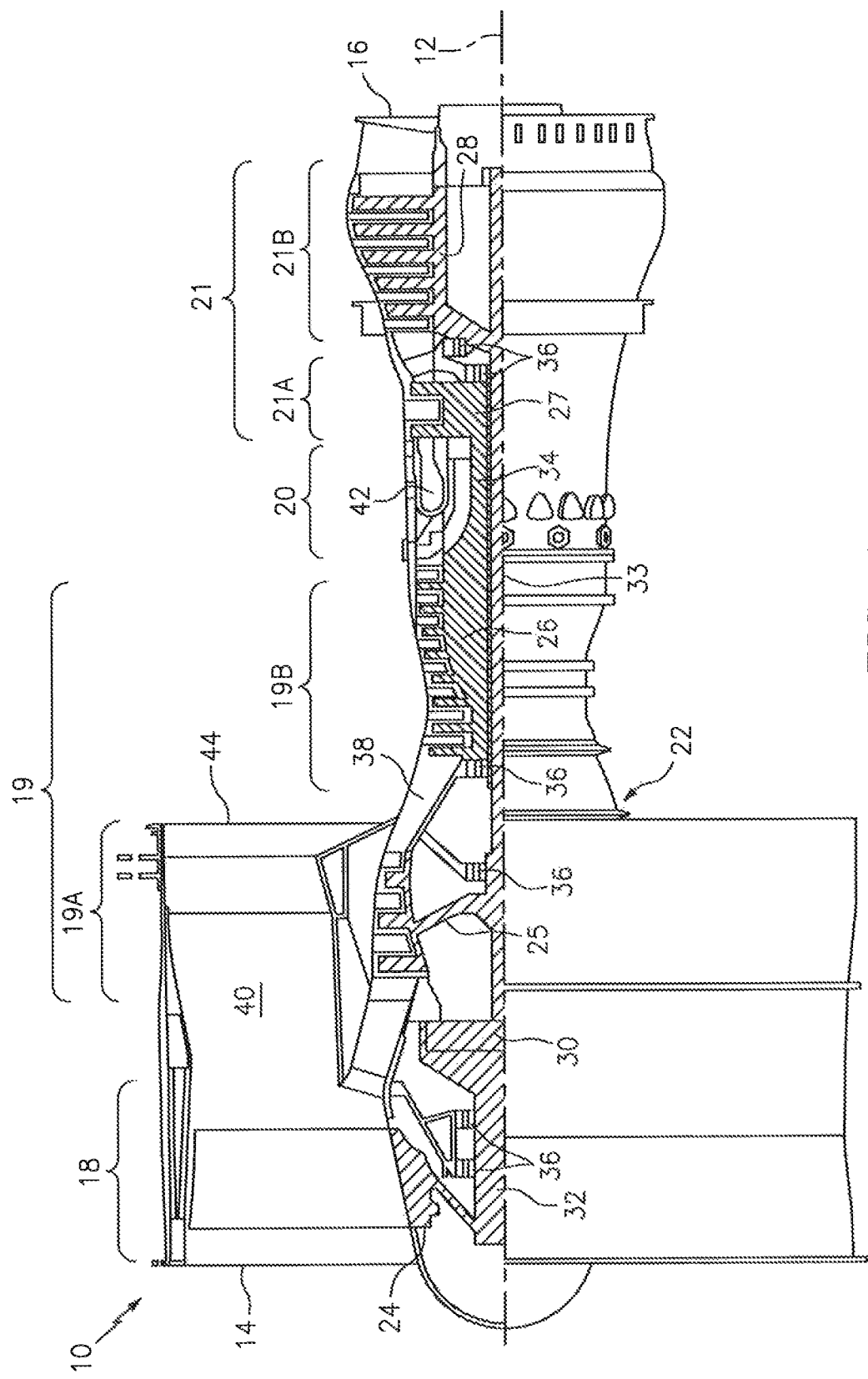
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the ITT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines.

Figure 2A:
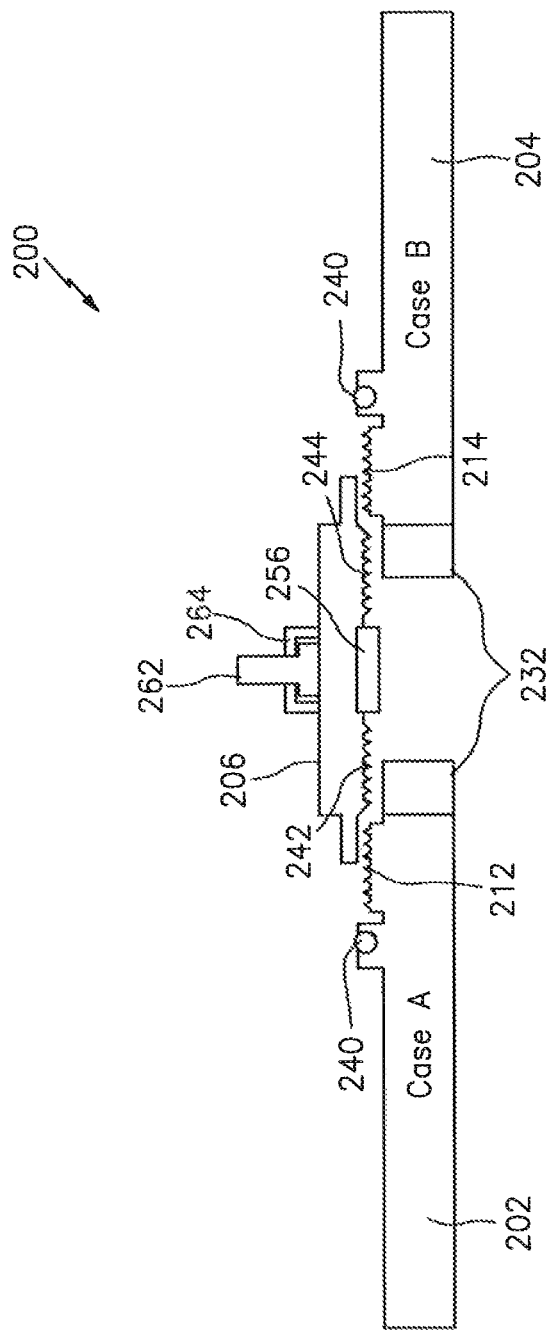
FIG. 2A illustrates a system for coupling cases together, where the cases are shown in an uncoupled state.

Referring to FIG. 2A, a system 200 is shown. The system 200 may be used to couple a first case 202 (case A) and a second case 204 (case B) to one another. One or both of the cases 202 and 204 may be associated with ducts, a turbine (e.g., turbine sections 21A and 21B), etc. One or both of the cases 202 and 204 may be circular cases.

The cases 202 and 204 may be coupled to one another via a nut 206. The nut 206 may correspond to a "turnbuckle nut" as would be appreciated by one of skill in the art based on a review of this disclosure.

As shown in FIG. 2A, the first case 202 and a first portion of the nut 206 may include threads oriented in a first direction (e.g., oriented as left hand threads) as denoted via reference characters 212 and 242, respectively. The second case 204 and a second portion of the nut 206 may include threads oriented in a second direction (e.g., oriented as right hand threads) as denoted via reference characters 214 and 244, respectively. The threads 212 may be configured to mate with, or engage, the threads 242. The threads 214 may be configured to mate with, or engage, the threads 244.

One or both of the cases 202 and 204 may include, or be associated with, an interface 232. The interface 232 may be used for purposes of, or may be configured to provide, one or more of anti-rotation, alignment, or support with respect to one or more of the case 202, the case 204, or the nut 206. The interface 232 may be characterized by, or include, a castellated structure. The interface 232 may include studs and holes. In some embodiments, the interface 232 may include a curvic-type interface. Briefly referring to FIGS. 6A-6C, examples of a curvic-type of interface are shown.

Figure 6A:
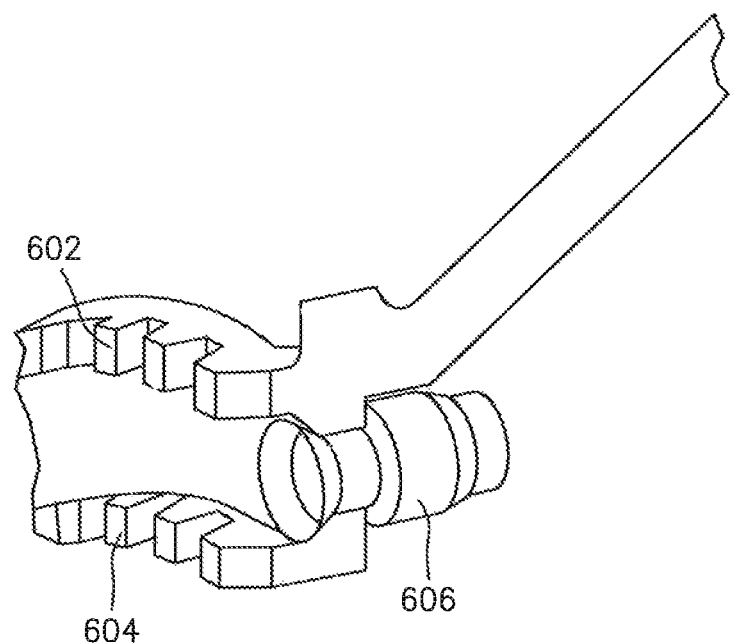
FIGS. 6A-6C illustrate exemplary curvic-type interfaces.

In FIG. 6A, rows 602 and 604 of curvic teeth are shown arranged proximate to or about a shank nut 606. While two rows of curvic teeth are shown in FIG. 6A, any number of rows may be used.

Figure 6B:
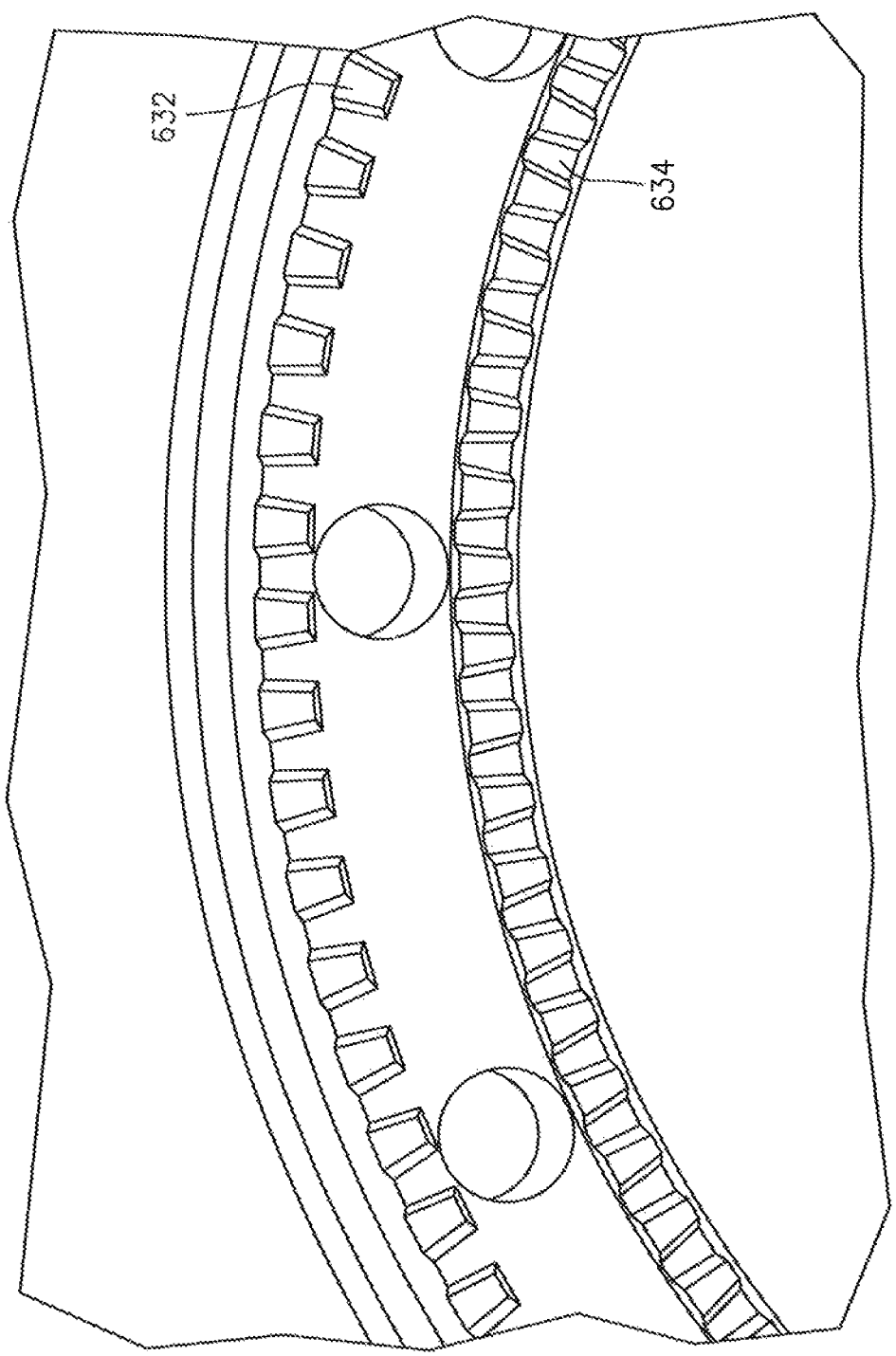

FIG. 6B illustrates rows 632 and 634 of curvic teeth from the perspective of aft looking forward. The direction of tapering associated with the teeth is different, or alternates, in comparing the row 632 with the row 634.

Figure 6C:
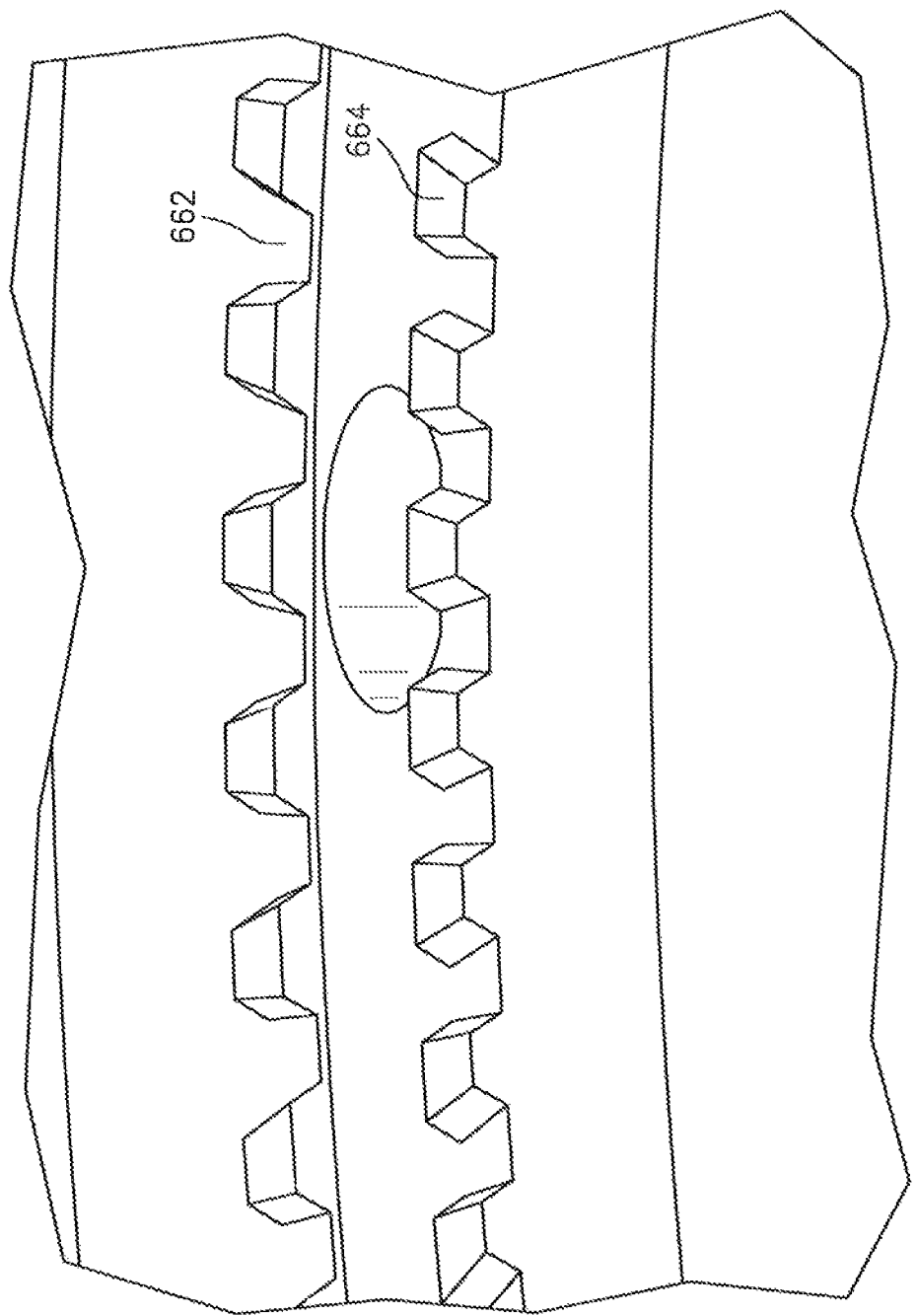

FIG. 6C illustrates rows 662 and 664 of curvic teeth from the perspective of a radial inboard position looking outboard. Much like FIG. 6B, in FIG. 6C the direction of tapering associated with the teeth is different, or alternates, in comparing the row 662 with the row 664.

Referring back to FIG. 2A, one or both of the cases 202 and 204 may include, or be associated with, a seal 240. The seal(s) 240 may be compressed by corresponding piston/retention rings during an installation procedure to couple the cases 202 and 204 together, described below with respect to FIG. 2B.

Figure 2B:
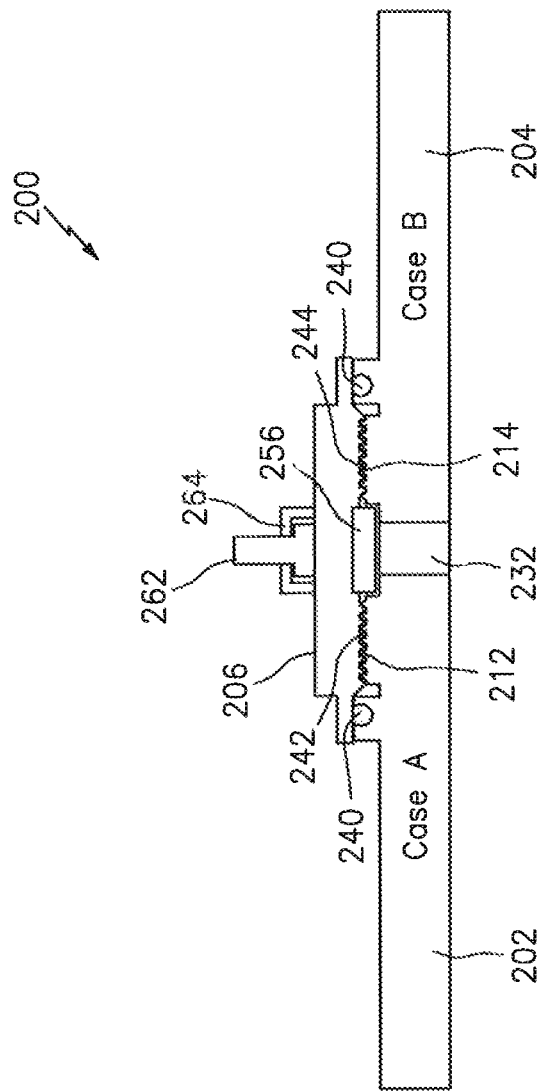
FIG. 2B illustrates the system of FIG. 2A where the cases are coupled to one another.

Whereas FIG. 2A illustrates the system 200 (e.g., the cases 202 and 204) in an uncoupled state, FIG. 2B illustrates the system 200 in a coupled state wherein the cases 202 and 204 have been pulled together by turning/rotating the nut 206 to engage the threads 212 and 214 with their counterpart threads 242 and 244, respectively. Once the eases 202 and 204 are pulled/coupled together, the retention rings associated with the seals 240 may be (automatically) pushed off or removed.

As shown in FIGS. 2A-2B, the system 200 may include an insulation ring 256. The insulation ring 256 may isolate, e.g., the nut 206 from hot air associated with the operation of the engine. The insulation ring 256 may be made of one or more materials, such as for example a metallic material, a woven ceramic (sheathed or unsheathed), etc.

The system 200 may include a (bracket T-head) bolt 262 and associated bracket bolt rail 264. The bolt 262 and rail 264 are exemplary of a mechanism that may be configured to attach the system 200 (or a portion thereof—e.g., the nut 206) to, e.g., a bracket.

In some embodiments, a dimension/length of the threads 212 and 214 may be equal or substantially equal as shown in FIGS. 2A-2B. Analogously, the count of the threads 212 and 214 may be equal or substantially equal.

In some embodiments, the dimension/length of the threads 212 and 214 may be unequal. For example, in connection with the system 300 shown in FIGS. 3A-3B the case 204 is shown as including threads 214 that are longer (or analogously, of a higher thread count) than the threads 212 associated with the case 202.

Figure 3A:
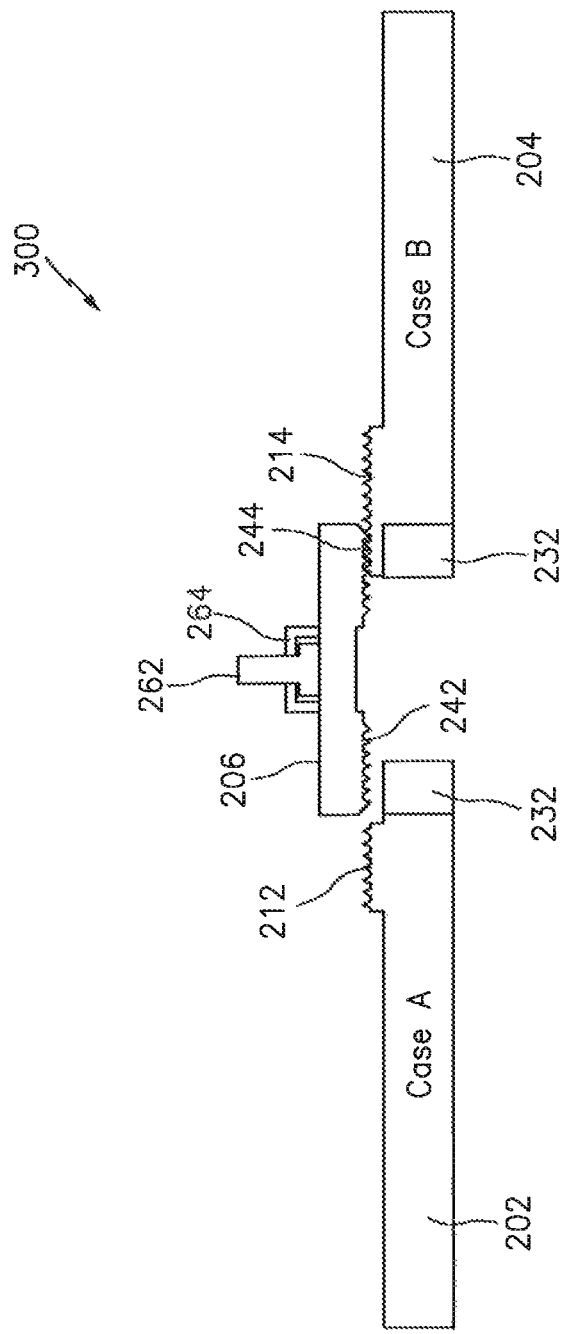
FIG. 3A illustrates a system for coupling cases together, where the cases are shown in an uncoupled state.
Figure 3B:
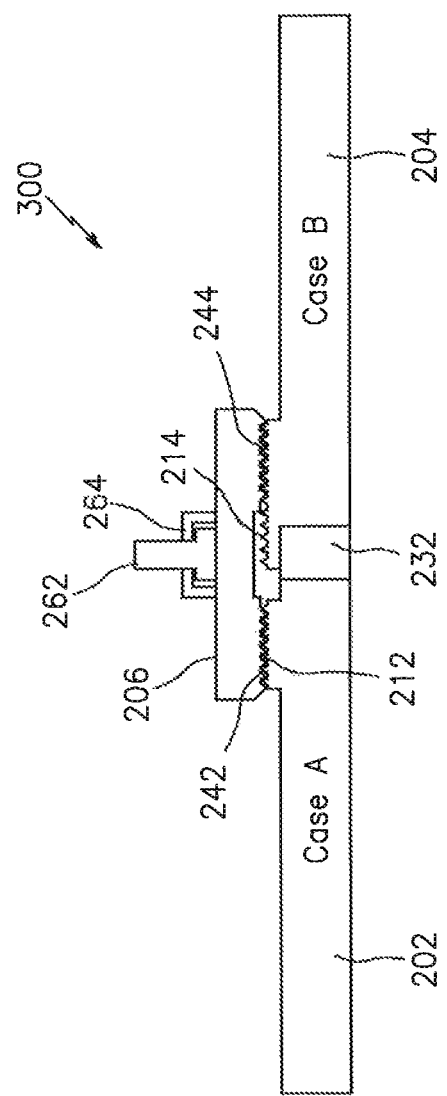
FIG. 3B illustrates the system of FIG. 3A where the cases are coupled to one another.

The use of the longer or extra threads 214 (relative to the threads 212) may allow starting the nut 206 on one side (e.g., on the side of the case 204) when undertaking/starting the procedure to bring the cases together as shown in FIG. 3A, which may be easier than starting from the uncoupled state depicted in FIG. 2A. The result of bringing the cases 202 and 204 together (starting from FIG. 3A) is shown in FIG. 3B.

In some embodiments, the nut 206 may include, or be associated with, various features. For example, a backing nut may be provided on each side of the nut 206. A safety wire may be attached to one or more tabs on each side of the nut 206 and then to the cases 202 and 204, Screws (e.g., set screws) may project radially inward through the nut 206 or go through bosses on the case 202 or the case 204 and push the ends of the nut 206. In some embodiments, tack welding may be used, particularly in embodiments where the nut 206 is removed or cut off as described below.

Figure 4:
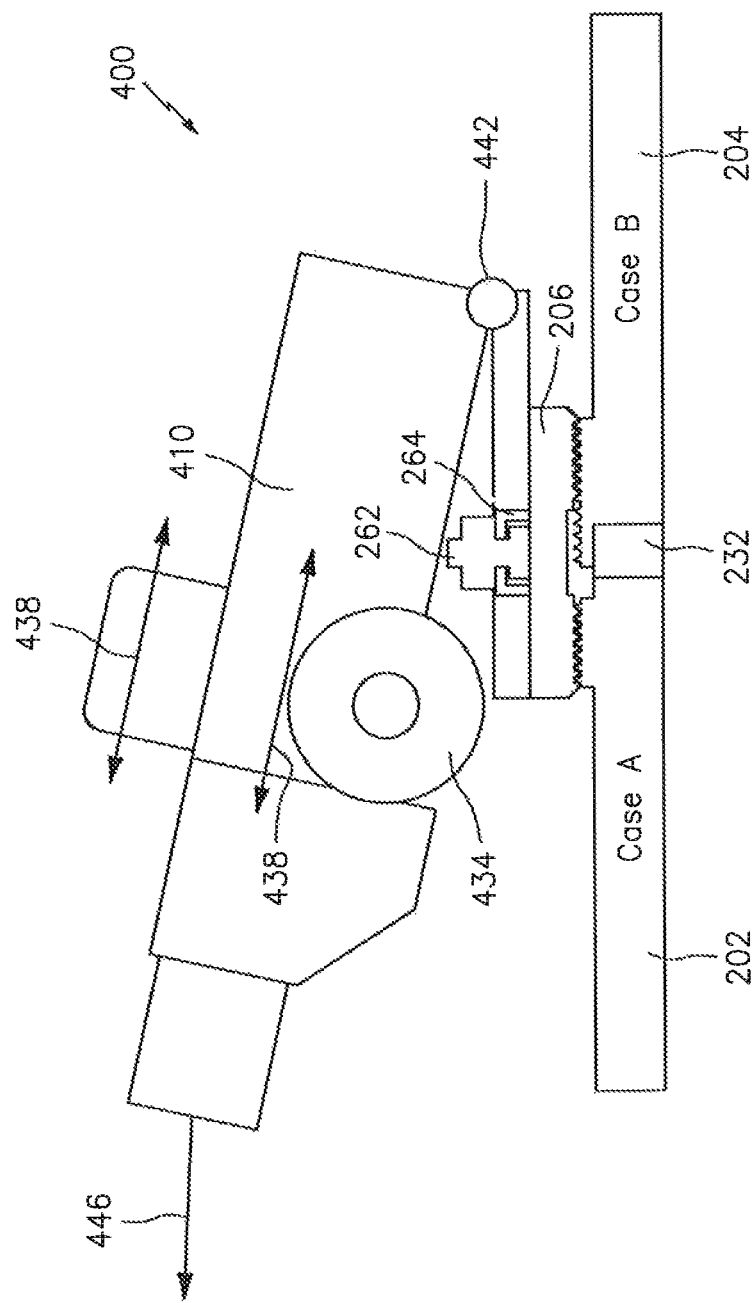
FIG. 4 illustrates an exemplary tool for removing a nut.

Referring to FIG. 4, a system 400 is shown. The system 400 may be indicative of an environment that is used for removing the nut 206. The nut 206 may be cut off to eliminate/reduce seizure or galling/wear, thereby extending the lifetime of the various components described herein.

The system 400 is shown as including a cutting tool 410. The cutting tool 410 may include a cutting wheel 434. The wheel 434 may be depth limited with respect to the nut 206) and may be configured to slide (as reflected via the arrows 438) over a given length of the nut 206 to provide for a "mostly" complete cut. To the extent that a portion of the nut 206 remains alter application of the cutting wheel 434, that portion may be jacked apart to complete the split.

In FIG. 4, reference character 442 represents a hinged connection. The hinged connection may be formed between the cutting tool 410 and, e.g., the rail 264. Other configurations may be used, particularly those that provide stability during the removal procedure.

In FIG. 4, arrow 446 represents a connection from the cutting tool 410 to a vacuum source. The vacuum source may be used to collect any debris that may be generated.

Figure 5A:
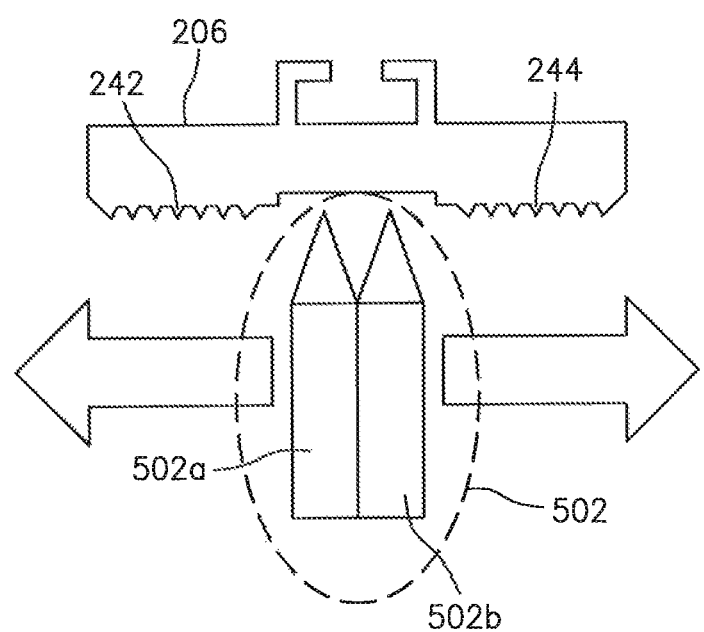
FIG. 5A illustrates a tool for forming threads on a nut.

Referring to FIG. 5A, a tool 502 is shown for forming symmetrical threads 242 and 244 on the nut 206. The provisioning of symmetrical threads 242 and 244 may provide for the same or common engagement points on the nut 206.

The tool 502 may include a first cutter 502a that forms the threads 242 and a second cutter 502b that forms the threads 244. The cutters 502a and 502b may be centered on an inner diameter (ID) of the nut 206 and then separated from one another as the nut 206 is turned to form the threads 242 and 244 in a symmetrical manner. Alternatively, the cutters 502a and 502b may initially be located on the outer edges of the nut 206 and then brought towards one another to form the threads 242 and 244.

Figure 5B:
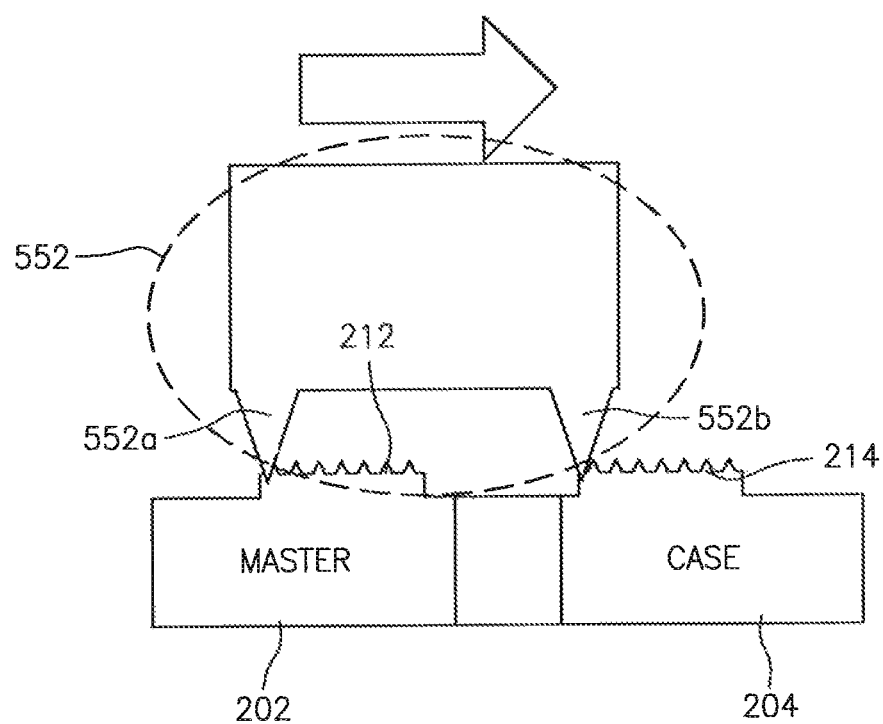
FIG. 5B illustrates a tool for forming threads on cases.

Referring to FIG. 5B, a tool 552 is shown for forming symmetrical threads 212 and the 214 on the cases 202 and 204, respectively. The tool 552 may be arranged to operate on the principle of a master-slave configuration, where the formation of the threads on a first case (e.g., the formation of the threads 212 on the case 202) may lead to the formation of the threads on a second case (e.g., the formation of the threads 214 on the case 204).

In accordance with the description above in connection with FIG. 5B, the case 202 has been designated as a "master" and the case 204 has been designated as a "slave" with respect to the tool 552. One skilled in the art would appreciate that an alternative designation may have been used, where the ease 202 may be designated as the slave and the case 204 may be designated as the master.

Aspects of the disclosure include one or more sets of threads mounted to, or integrally formed with, one or more components/devices. A first set of threads may be formed on a (first) surface of a first component/device. The first set of threads may be configured to engage a second set of threads formed on a (second) surface of a second component/device.

Aspects of the disclosure may be configured for applications/locations to act as a coupling in addition to an aerodynamic fairing to reduce losses that are associated with airflow over a conventional bolted flange.

Technical effects and benefits of this disclosure include an enhancement or extension of one or more component or device lifetimes. A case coupling designed and manufactured in accordance with aspects of this disclosure greatly reduces or eliminates thermal gradient stresses associated with conventional bolted flanges. This coupling may eliminate a need for bolts and the requirement to manufacture a bolt flange into a case. Aspects of the disclosure may eliminate a need for a snap diameter for support and case sealing, as well, as eliminate a need to repair the snap diameter. Aspects of the disclosure may eliminate a need for specific bolts in specific holes for brackets. Aspects of the disclosure may eliminate a need for expensive close tolerance holes with close tolerance bolts. Wrench clearance issues may be eliminated. The use of complicated torque procedures may be avoided. The likelihood of bolts seizing at disassembly may be reduced/eliminated.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A system for selectively coupling cases comprising:
   a gas turbine engine first turbine case including a first plurality of threads;
   a gas turbine engine second turbine case including a second plurality of threads, where the first turbine case and the second turbine case are coaxial about a centerline and axially adjacent;
   an interface configured to provide for at least one of anti-rotation or alignment with respect to the first turbine case and the second turbine case;
   a nut including a third plurality of threads configured to engage with the first plurality of threads and a fourth plurality of threads configured to engage with the second plurality of threads; and
   an insulation ring axially between the third plurality of threads and the fourth plurality of threads with respect to the centerline and radially outside the interface, configured to isolate the nut from hot air of an engine;
   wherein the first turbine case includes a first seal that radially seals against the nut and is axially upstream of the third plurality of threads with respect to the centerline, and the second turbine case includes a second seal that radially seals against the nut and is axially downstream of the fourth plurality of threads with respect to the centerline.

2. The system of claim 1, wherein the first plurality of threads and the third plurality of threads are oriented in a first direction, and wherein the second plurality of threads and the fourth plurality of threads are oriented in a second direction.

3. The system of claim 1, wherein the first plurality of threads and the third plurality of threads are oriented as left hand threads, and wherein the second plurality of threads and the fourth plurality of threads are oriented as right hand threads.

4. The system of claim 1, wherein the insulation ring is made of at least one of a metallic material or a woven ceramic.

5. The system of claim 1, further comprising:
   an attachment mechanism configured to attach the nut to a bracket.

6. The system of claim 5, wherein the attachment mechanism includes a T-head bolt and a bracket bolt rail.

7. The system of claim 1, wherein the first plurality of threads and the second plurality of threads are substantially equal in terms of dimension or count.

8. The system of claim 1, wherein the first plurality of threads and the second plurality of threads are unequal in terms of dimension or count.

9. The system of claim 1, wherein the first turbine case is part of a high pressure turbine section of the engine.

10. The system of claim 9, wherein the second turbine case is part of a low pressure turbine section of the engine.

11. The system of claim 1, wherein at least one of the first turbine case or the second turbine case is part of a duct.

12. The system of claim 1, wherein at least one of the first turbine case or the second turbine case is a circular case.

13. The system of claim 1, wherein the interface includes a curvic-type interface.

14. The system of claim 1, wherein the nut is configured to rotate to cause the first plurality of threads to engage the third plurality of threads and the second plurality of threads to engage the fourth plurality of threads to couple the first turbine case and the second turbine case.

15. The system of claim 1, wherein the third plurality of threads and the fourth plurality of threads are formed as symmetric threads via application of a first cutter to form the third plurality of threads and a second cutter to form the fourth plurality of threads.

16. The system of claim 1, wherein the first plurality of threads and the second plurality of threads are formed as symmetric threads via application of a tool that includes a first cutter and a second cutter arranged in a master-slave configuration.

* * * * *